Patented Dec. 8, 1942

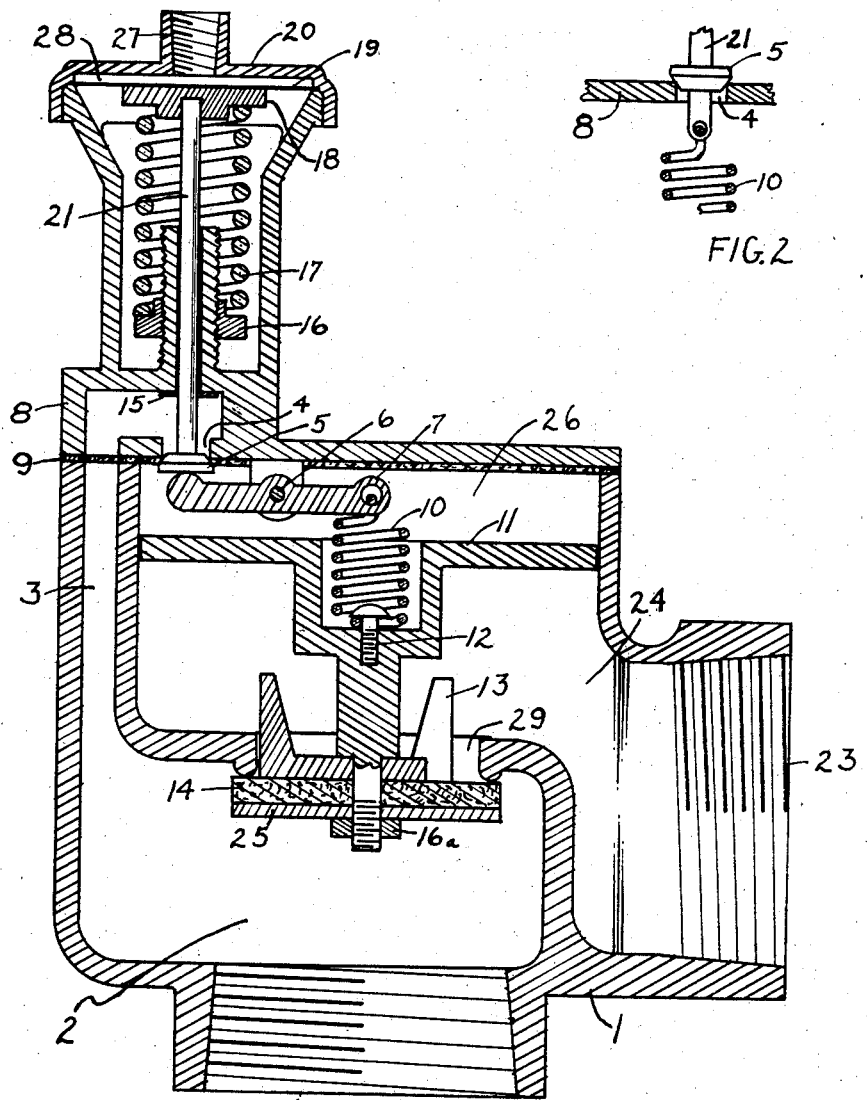

2,304,323

UNITED STATES PATENT OFFICE 2,304,323

PRESSURE OPERATED THROTTLING VALVE

Irvin E. Wiegers, Overland, Mo.

Application May 20, 1941, Serial No. 394,297

4 Claims. (Cl. 137—155)

My invention relates to improvements in pressure operated valves of the throttling type in which the main valve is energized by the pressure of the fluid which it is controlling. One object of the invention is to provide a valve in which the valve movement is greater than is attained by valves which respond to movements of a flexing means such as a diaphragm or bellows but retains throttling action. Another object is to make valve movement relatively independent of the effects of friction. These objects can be obtained by the mechanisms illustrated in the accompanying drawing.

Figure 1 illustrates a mechanism in which valve opening increases upon increase of control pressure above the opening point. Figure 2 shows the arrangement of pilot valve and seat which is preferably centralized over piston 11 to attain an increase in valve opening upon decrease of control pressure below the opening point.

In Figure 1 the fluid whose flow is to be controlled enters the valve through the opening 22 to the inlet chamber 2. This fluid is transmitted at inlet pressure through passage 3 to pilot valve seat port 4. The pilot valve 5 is energized by the force of the control pressure in chamber 28 formed by flexing means 19 and cover 20 when the force on the buffer plate 18 due to said pressure is greater than the force due to spring 17 whose force is adjustable by means of nut 16. Buffer plate 18 is preferably securely fastened to stem 21 which transmits motion to pilot valve 5. Opening of the pilot valve 5 will cause the pressure of the fluid whose flow is to be controlled to be transmitted to chamber 26 and to fall upon the piston 11 whose area is greater than main valve port 29. Valve disc 14, which is guided by pronged guide 13 and assembled to piston 11 by means of retaining plate 25 and nut 16a, will be forced open until the force of spring 10, which is secured to the piston 11 by screw 12 and transmitted to pilot valve 5 by means of lever 7 and fulcrum 6, is sufficient to counterbalance the excess force of pressure in chamber 28 over force of spring 17 causing pilot valve 5 to assume a throttling position. By this means the movement of the disc 14 from seat port 29 is made proportional to excess of force of control pressure upon flexing means 19 over force of spring 17, so long as pressure in inlet chamber 2 exceeds pressure in outlet chamber 24 by an amount sufficient to operate valve 14. The proportion of main valve opening to said force difference can be varied by changing the rate of spring 10 and/or by shifting fulcrum 6 relative to points of application of forces on lever 7. Main valve 14 can also be made to move freely through a fixed distance before assuming a throttling position by adjusting point at which spring 10 becomes active.

The above description will also apply to the mechanism suggested in Figure 2 except that valve opening will be affected by excess of force of spring 17 over force of control pressure on flexing means 19.

Control pressure is transmitted to chamber 28 through opening 27. A seal is obtained between valve body 1 and cover 8 by means of gasket 9 and suitable fastening. Outlet for the valve is provided by opening 23. Membrane or packing 15 provides seal around stem 21.

It is likely that in some applications of this invention dash-pots attached to pilot valve or to piston or to both will be desirable to eliminate chattering or water hammer.

The control pressure referred to in this specification might be supplied by a volatile charge, a pneumatic thermostat, a vapor to be heated or cooled, or may be the pressure of the fluid to be controlled, but the invention is not limited to these uses.

It is to be understood that there is sufficient leakage around the edge of piston 11 to allow the valve 14 to close when pilot valve 5 closes. Where a membrane is used instead of piston 11 a vent would be provided.

What I claim is:

1. In a valve of the character described, a valve casing having an inlet chamber, a main valve member in said inlet chamber, a discharge chamber, a valve port connecting said inlet chamber to said discharge chamber controlled by said main valve member, vented piston means in said discharge chamber operatively connected to said main valve member, said piston means forming a power chamber with said casing, passageway from said inlet chamber to said power chamber through a wall of said casing, a pilot valve member controlling said passageway, said pilot valve member having a resilient connection to said piston means so that motion of main valve member toward open position urges pilot valve member toward closed position.

2. In a valve of the character described, a valve casing having an inlet chamber, a main valve member in said inlet chamber, a discharge chamber, a valve port connecting said inlet chamber to said discharge chamber controlled by said main valve member, vented piston means in said discharge chamber operatively connected to said main valve member, said piston means forming a power chamber with said casing, passageway from said inlet chamber to said power chamber through a wall of said casing, a pilot valve member controlling said passageway, said pilot valve member being operatively connected to a pressure responsive means and having a resilient connection to said piston means.

3. In a valve of the character described, a valve casing having an inlet chamber and an outlet chamber, a main valve member controlling a port between said chambers, vented piston means energized by the pressure of the fluid passing through the valve operatively connected to said main valve member, said piston means forming a power chamber with a wall of said casing, passageway through said casing wall communicating with said power chamber, a pilot valve member controlling said passageway, said pilot valve member being operatively connected to a pressure responsive means and having a resilient connection to said piston means.

4. In a valve of the character described, a valve casing having an inlet chamber, an outlet chamber, a main valve member controlling a port between said chambers, vented piston means operatively connected to said main valve member, said piston means forming a power chamber with a wall of said casing, passageway from said inlet chamber to said power chamber through said casing wall, a pilot valve member controlling said passageway, said pilot valve member being operatively connected to a pressure responsive means and having a resilient connection to said piston means.

IRVIN E. WIEGERS.